US010378224B2

(12) United States Patent
Silvestro

(10) Patent No.: US 10,378,224 B2
(45) Date of Patent: Aug. 13, 2019

(54) STRUCTURAL ROB PROTECTIVE DEVICE

(71) Applicant: Joseph Silvestro, Parkville, MO (US)

(72) Inventor: Joseph Silvestro, Parkville, MO (US)

( * ) Notice: Subject to any disclaimer, the term of this patent is extended or adjusted under 35 U.S.C. 154(b) by 0 days.

(21) Appl. No.: 15/843,175

(22) Filed: Dec. 15, 2017

(65) Prior Publication Data

US 2019/0186159 A1 Jun. 20, 2019

(51) Int. Cl.
*E04G 21/32* (2006.01)
*E04C 5/16* (2006.01)
*A01G 9/28* (2018.01)

(52) U.S. Cl.
CPC ........... *E04G 21/3252* (2013.01); *A01G 9/28* (2018.02); *E04C 5/161* (2013.01); *E04G 21/32* (2013.01)

(58) Field of Classification Search
CPC ..... E04G 21/3252; E04G 21/32; E04C 5/161; A01G 9/28
USPC ......... 52/244, 296, 298, 300, 301, 677, 689, 52/698, 704, 741.3, 749.1, DIG. 12; 138/96 R, 96 T; 248/188.9, 511, 519, 248/523; 254/100, 133 R; 256/59, 65, 256/DIG. 6; 285/92
See application file for complete search history.

(56) References Cited

U.S. PATENT DOCUMENTS 606,151 A * 6/1898 Johnson .................. A01G 1/08 47/33
2,222,002 A * 11/1940 Sewell .................... B25D 7/00 138/96 R
2,725,898 A * 12/1955 Stansbury ............. B65D 59/02 138/96 R
3,160,175 A * 12/1964 Laemmle .............. B65D 59/06 138/109
3,350,044 A * 10/1967 Zulauf ...................... F16L 1/10 138/96 R
3,420,275 A * 1/1969 Glen ........................ H02G 3/02 138/96 R
4,308,701 A * 1/1982 Wojick .................... E04C 5/161 52/244
4,702,034 A * 10/1987 Ferguson ................ A01G 9/28 47/33
5,414,956 A * 5/1995 Kheradpir ................ A01G 9/28 47/33
5,447,290 A * 9/1995 Workman .............. E04C 5/161 256/59
5,649,688 A * 7/1997 Baker .................. E04F 11/181 256/21
5,950,680 A * 9/1999 Randall ..................... E04C 5/02 138/177
6,018,918 A * 2/2000 Long, Sr. ................. E04B 1/68 52/100
(Continued)

*Primary Examiner* — Ryan D Kwiecinski
*Assistant Examiner* — Matthew J Gitlin

(57) ABSTRACT

A structural rod protective device for preventing injury to persons falling on structural rods includes a first panel. Each of a pair of second panels is coupled to and extends perpendicularly from a respective opposing edge of the first panel to define a channel. Each of a plurality of slats is coupled to and extends between the second panels. The plurality of slats defines a plurality of slots. The second panels are configured to selectively position over linear and nonlinear rows of structural support rods, such as rebar. Each rod is inserted into a respective slot so that an end of the rod abuts the first panel. Persons falling on the rods are protected from impalement upon the rods.

13 Claims, 4 Drawing Sheets

(56) References Cited

U.S. PATENT DOCUMENTS

| | | | | | |
|---|---|---|---|---|---|
| 6,073,415 | A | | 6/2000 | Carnicle | |
| 6,102,374 | A | * | 8/2000 | Macri | A01G 9/28 256/24 |
| 6,199,333 | B1 | * | 3/2001 | Viduka, Jr. | E04C 5/161 52/300 |
| 6,662,514 | B2 | | 12/2003 | Workman | |
| 6,857,235 | B2 | * | 2/2005 | Niday | E04C 5/161 248/188.9 |
| 7,118,096 | B2 | * | 10/2006 | Petrozziello | A01K 3/00 256/32 |
| 7,174,689 | B2 | * | 2/2007 | Alyea | E04B 1/4157 52/700 |
| 8,776,464 | B2 | * | 7/2014 | Kassarjian | E04G 21/3252 138/96 R |
| D737,120 | S | | 8/2015 | Recker et al. | |
| 9,133,636 | B2 | * | 9/2015 | Hewlett | E04C 5/161 |
| 2006/0043256 | A1 | * | 3/2006 | Bogrett | A01G 9/28 249/2 |
| 2007/0180764 | A1 | * | 8/2007 | Forman | A01G 9/28 47/33 |
| 2014/0017426 | A1 | * | 1/2014 | Kassarjian | E04G 21/3252 428/35.6 |

* cited by examiner

STRUCTURAL ROB PROTECTIVE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to protective devices and more particularly pertains to a new protective device for preventing injury to persons falling on structural rods.

BRIEF SUMMARY OF THE INVENTION

An embodiment of the disclosure meets the needs presented above by generally comprising a first panel. Each of a pair of second panels is coupled to and extends perpendicularly from a respective opposing edge of the first panel to define a channel. Each of a plurality of slats is coupled to and extends between the second panels. The plurality of slats defines a plurality of slots. The second panels are configured to selectively position over linear and nonlinear rows of structural support rods, such as rebar. Each rod is inserted into a respective slot so that an end of the rod abuts the first panel. Persons falling on the rods are protected from impalement upon the rods.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
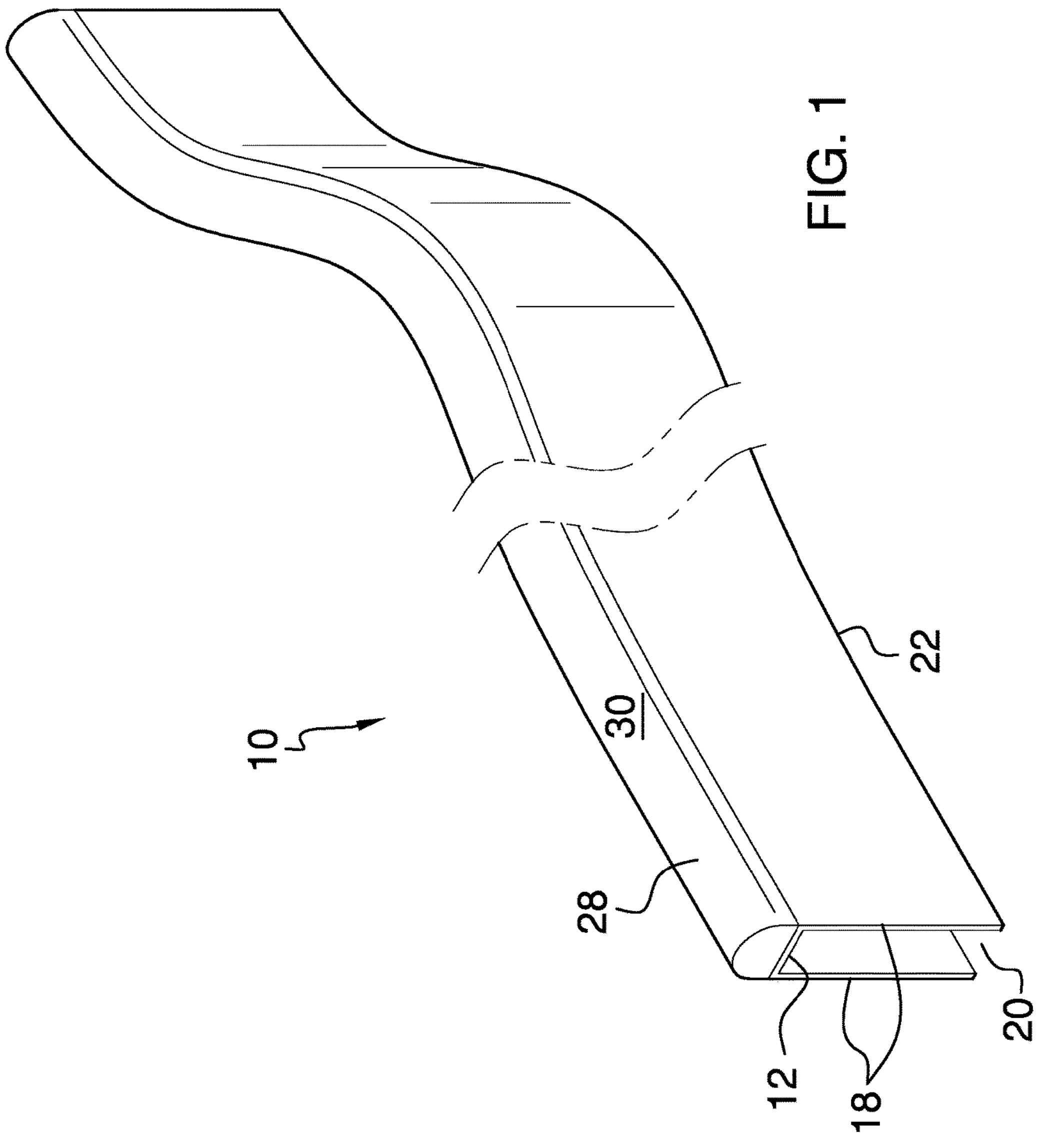
FIG. 1 is an isometric perspective view of a structural rod protective device according to an embodiment of the disclosure.
Figure 2:
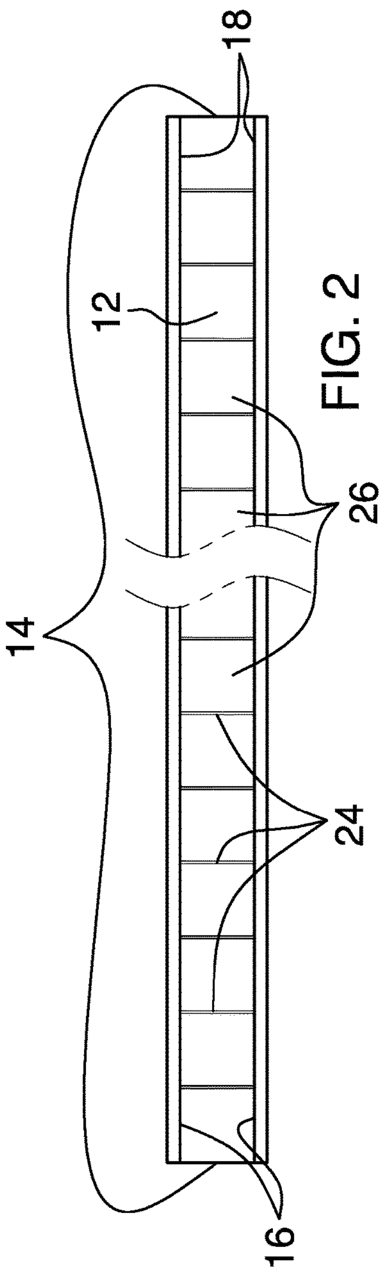
FIG. 2 is a bottom view of an embodiment of the disclosure.
Figure 3:
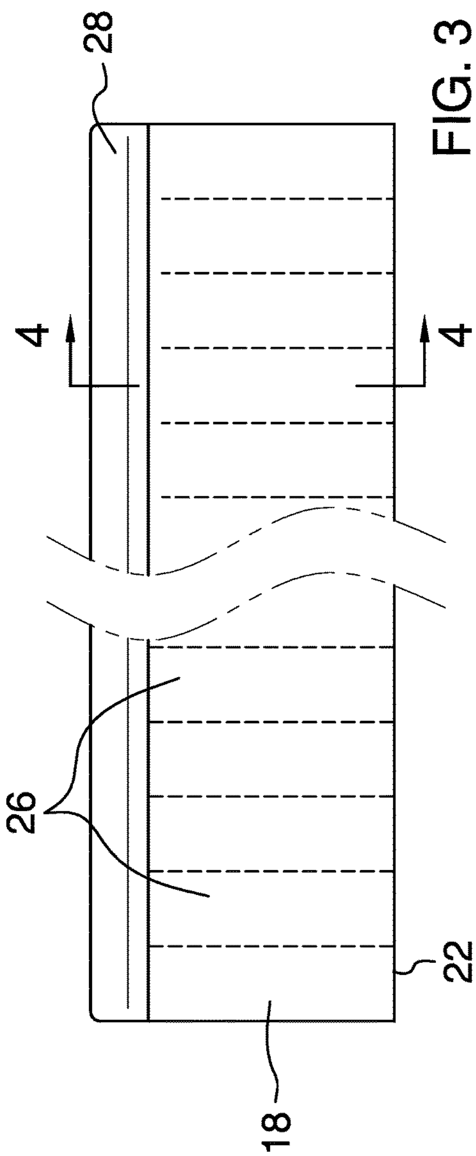
FIG. 3 is a side view of an embodiment of the disclosure.
Figure 4:
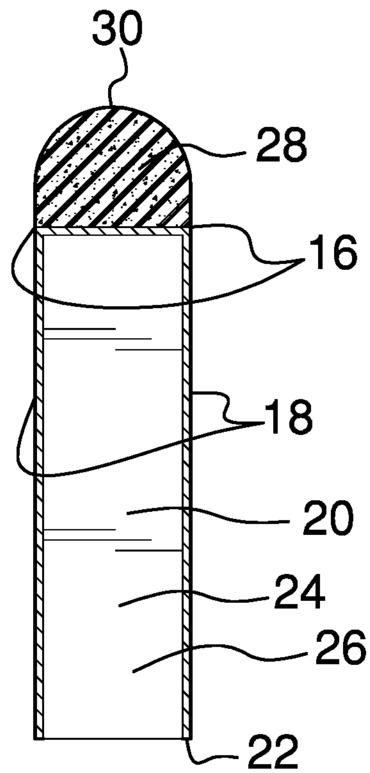
FIG. 4 is a cross-sectional view of an embodiment of the disclosure.
Figure 5:
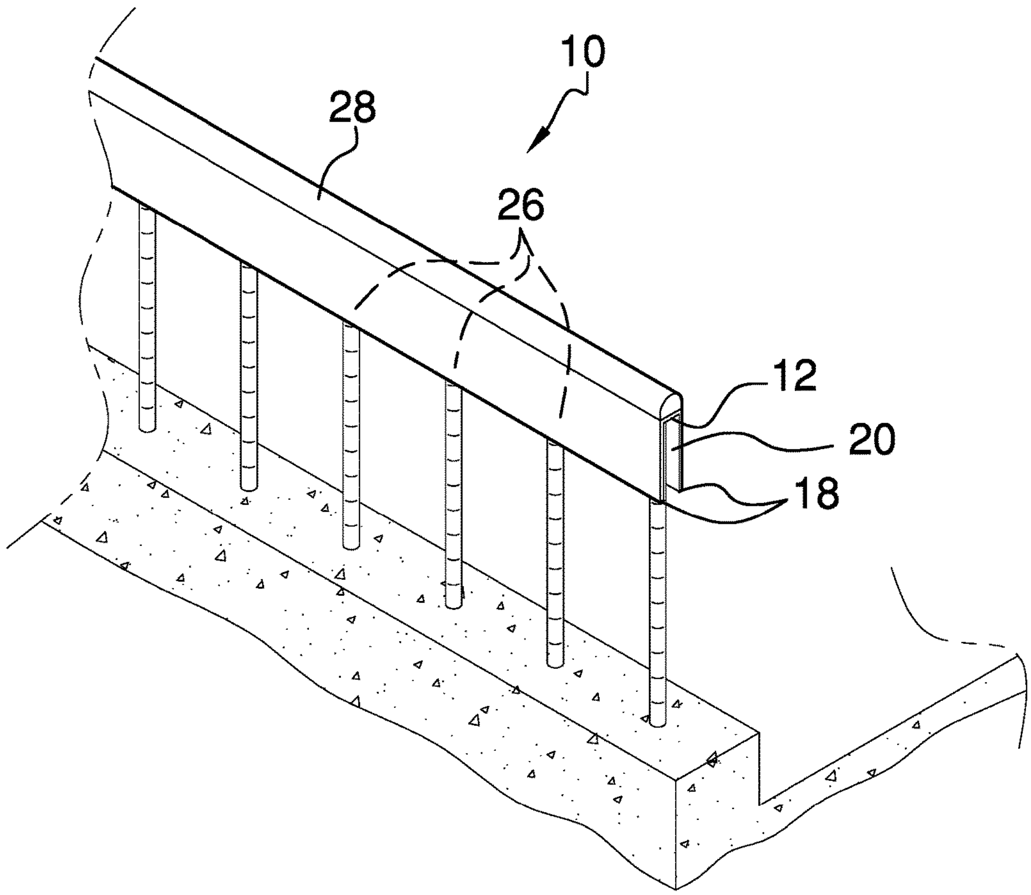
FIG. 5 is an in-use view of an embodiment of the disclosure.

With reference now to the drawings, and in particular to FIGS. 1 through 5 thereof, a new protective device embodying the principles and concepts of an embodiment of the disclosure and generally designated by the reference numeral 10 will be described.

As best illustrated in FIGS. 1 through 5, the structural rod protective device 10 generally comprises a first panel 12. In one embodiment, the first panel 12 is elongated rectangularly shaped. The first panel 12 has opposing ends 14 and opposing edges 16. In another embodiment, the opposing ends 14 are separated by from 3.0 to 15.3 meters. In yet another embodiment, the opposing edges 16 are separated by from 2.5 to 5.1 centimeters.

Each of a pair of second panels 18 is coupled to and extends perpendicularly from a respective opposing edge 16 of the first panel 12 to define a channel 20. The first panel 12 and the second panels 18 are flexible so that the first panel 12 and the second panel 18 are configured to position in a roll to stow. Each second panel 18 has a rim 22 that is positioned distal from the first panel 12. In one embodiment, the rim 22 and the first panel 12 are separated by from 10.0 to 13.0 centimeters.

Each of a plurality of slats 24 is coupled to and extends between the second panels 18. The plurality of slats 24 defines a plurality of slots 26. The second panels 18 are configured to selectively position over linear and nonlinear rows of structural support rods, such as rebar. Each rod is inserted into a respective slot 26 so that an end of the rod abuts the first panel 12. Persons falling on the rods are protected from impalement upon the rods.

In one embodiment, the slats 24 are evenly spaced so that the slots 26 are evenly sized. In another embodiment, the first panel 12, the second panels 18, and the slats 24 comprise plastic. In yet another embodiment, the first panel 12, the second panels 18, and the slats 24 comprise polypropylene.

An extrusion 28 is coupled to and extends from the first panel 12. The extrusion 28 is opposingly positioned to the second panels 18. The extrusion 28 is resilient. The extrusion 28 is configured to deter penetration of the ends of the rods through the first panel 12 upon impact of a person falling upon the rods. In one embodiment, the extrusion 28 comprises nylon. The extrusion 28 has an upper surface 30. In another embodiment, the upper surface 30 is arcuate so that the upper surface 30 is configured to deter adherence of wet concrete that impacts the extrusion 28.

In use, the second panels 18 are configured to selectively position over the linear and the nonlinear rows of the structural support rods, such as the rebar. Each rod is inserted into a respective slot 26 such that the end of the rod abuts the first panel 12. The extrusion 28 is configured to deter the penetration of the ends of the rods through the first panel 12 upon the impact of the person falling upon the rods. Persons falling on the rods are protected from impalement upon the rods. The upper surface 30 of the extrusion 28 is arcuate so that the upper surface 30 is configured to deter adherence of the wet concrete that impacts the extrusion 28. The first panel 12 and the second panels 18 are flexible so that the first panel 12 and the second panel 18 are configured to position in the roll to stow.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A structural rod protective device comprising:

a first panel;

a pair of second panels, each said second panel being coupled to and extending perpendicularly from a respective opposing edge of said first panel defining a channel;

a plurality of slats, each said slat being coupled to said first panel and said second panels, and each of said slats extending between said second panels such that said plurality of slats defines a plurality of slots, each of said slats having a single free straight edge being coplanar with distal edges of said second panels relative to said first panel wherein each of said slots extends a full width and depth of said channel; and wherein said slats are positioned on said second panels such that said second panels are configured for selectively positioning over linear and nonlinear rows of structural support rods with each rod being inserted into a respective said slot such that an end of the rod abuts said first panel for protecting persons from impalement upon the rods.

2. The device of claim 1, further including said first panel and said second panels being flexible such that said first panel and said second panel are configured for positioning in a roll for stowing.

3. The device of claim 2, further including said first panel, said second panels, and said slats comprising plastic.

4. The device of claim 3, further including said first panel, said second panels, and said slats comprising polypropylene.

5. The device of claim 2, further including said first panel being elongated rectangularly shaped.

6. The device of claim 5, further including said first panel having opposing ends, said opposing ends being separated by from 3.0 to 15.3 meters.

7. The device of claim 5, further including said first panel having opposing edges, said opposing edges being separated by from 2.5 to 5.1 centimeters.

8. The device of claim 5, further including each said second panel having a rim positioned distal from said first panel, said rim and said first panel being separated by from 10.0 to 13.0 centimeters.

9. The device of claim 2, further including an extrusion coupled to and extending from said first panel, said extrusion being opposingly positioned to said second panels, wherein said extrusion is positioned on said first panel such that said extrusion is configured for deterring penetration of the ends of the rods through said first panel upon impact of a person falling upon the rods.

10. The device of claim 9, further including said extrusion comprising nylon.

11. The device of claim 9, further including said extrusion having an upper surface, said upper surface being arcuate such that said upper surface is configured for deterring adherence of wet concrete impacting said extrusion.

12. The device of claim 1, further including said slats being evenly spaced such that said slots are evenly sized.

13. A structural rod protective device comprising:

a first panel, said first panel being elongated rectangularly shaped, said first panel having opposing ends, said opposing ends being separated by from 3.0 to 15.3 meters, said first panel having opposing edges, said opposing edges being separated by from 2.5 to 5.1 centimeters;

a pair of second panels, each said second panel being coupled to and extending perpendicularly from a respective opposing edge of said first panel defining a channel, said first panel and said second panels being flexible such that said first panel and said second panel are configured for positioning in a roll for stowing, each said second panel having a rim positioned distal from said first panel, said rim and said first panel being separated by from 10.0 to 13.0 centimeters;

a plurality of slats, each said slat being coupled to said first panel and said second panels, and each of said slats extending between said second panels such that said plurality of slats defines a plurality of slots, each of said slats having a single free straight edge being coplanar with distal edges of said second panels relative to said first panel wherein each of said slots extends a full width and depth of said channel, said slats being evenly spaced such that said slots are evenly sized, said first panel, said second panels, and said slats comprising plastic, said first panel, said second panels, and said slats comprising polypropylene, wherein said slats are positioned on said second panels such that said second panels are configured for selectively positioning over linear and nonlinear rows of structural support rods with each rod being inserted into a respective said slot such that an end of the rod abuts said first panel for protecting persons from impalement upon the rods;

an extrusion coupled to and extending from said first panel, said extrusion being opposingly positioned to said second panels, said extrusion comprising nylon, said extrusion having an upper surface, said upper surface being arcuate such that said upper surface is configured for deterring adherence of wet concrete impacting said extrusion; wherein said extrusion is positioned on said first panel such that said extrusion is configured for deterring penetration of the ends of the rods through said first panel upon impact of a person falling upon the rods; and wherein said slats are positioned on said second panels such that said second panels are configured for selectively positioning over the linear and the nonlinear rows of the structural support rods with each rod being inserted into a respective said slot such that an end of the rod abuts said first panel, wherein said extrusion is positioned on said first panel such that said extrusion is configured for deterring the penetration of the ends of the rods through said first panel upon the impact of the person falling upon the rods for protecting the persons from impalement upon the rods, wherein said upper surface of said extrusion is arcuate such that said upper surface is configured for deterring adherence of the wet concrete impacting said extrusion, wherein said first panel and said second panels being flexible such that said first panel and said second panel are configured for positioning in the roll for stowing.

* * * * *